United States Patent [19]

Louwenaar

[11] 4,287,683

[45] Sep. 8, 1981

[54] SOLAR SHIELD

[76] Inventor: David W. Louwenaar, 1248 Ironton St., Aurora, Colo. 80010

[21] Appl. No.: 113,958

[22] Filed: Jan. 21, 1980

[51] Int. Cl.³ .............................................. E06B 3/32
[52] U.S. Cl. ........................................ 49/463; 49/61; 52/202; 52/801
[58] Field of Search ............... 49/463, 465, 61, 62, 49/63; 52/202, 203, 801

[56] References Cited

U.S. PATENT DOCUMENTS

| 2,724,465 | 11/1955 | Krauss et al. | 52/801 |
| 3,107,760 | 10/1963 | Graham | 52/202 X |
| 3,129,793 | 4/1964 | Ferrell | 52/202 X |
| 3,175,603 | 3/1965 | Tonnon | 52/203 UX |
| 3,375,611 | 4/1968 | Osten, Sr. | 49/463 X |
| 3,745,704 | 7/1973 | Covington | 49/463 X |
| 4,198,796 | 4/1980 | Foster | 52/203 |
| 4,221,091 | 9/1980 | Ganse et al. | 49/61 X |

Primary Examiner—Philip C. Kannan
Attorney, Agent, or Firm—Jack C. Sloan

[57] ABSTRACT

A solar shield for room windows reflects and dissipates solar energy by means of a reflective surface and backing piece between which is defined a warm air channel. The backing piece is positioned away from the window surface so that sunlight is admitted between the backing piece and the window being shielded.

3 Claims, 2 Drawing Figures

SOLAR SHIELD

BACKGROUND OF THE INVENTION

This invention relates to solar shields, and more specifically to solar shields which are used in conjunction with windows. The windows to be shielded are of known construction and will normally include panes which are either fixed or which are mounted in movable frames. In hot sunny climates, Venetian blinds or other types of shades are often placed on the inside of such windows. While the Venetian blinds are normally of a light color and thus reflect the light, this reflective function is not performed until the sun's energy has penetrated the window and hence has entered the room's airspace.

It is therefore the primary object of this invention to provide a solar shield which can be placed on the outside of the window to reflect and dissipate the sun's energy before this energy enters the room's airspace. The solar shield is mounted in such a way that it passes some light around its edges while still reflecting most of the sun's energy during those hours of the day when the sun's energy is most intense. Before and after this period of maximum sun intensity, the solar shield can be removed to admit maximum light through the window.

Another object of this invention is to provide effective solar shield means on an economical basis to residences and other people occupied spaces having windows, particularly those facing east, south, or west in order that air conditioning costs can be significantly lowered.

These together with other objects and advantages which will become subsequently apparent reside in the details of construction and operation as more fully hereinafter described and claimed, reference being made to the accompanying drawings forming a part hereof, wherein like numerals refer to like parts throughout, and in which:

DESCRIPTION OF PREFERRED EMBODIMENT

Figure 1:
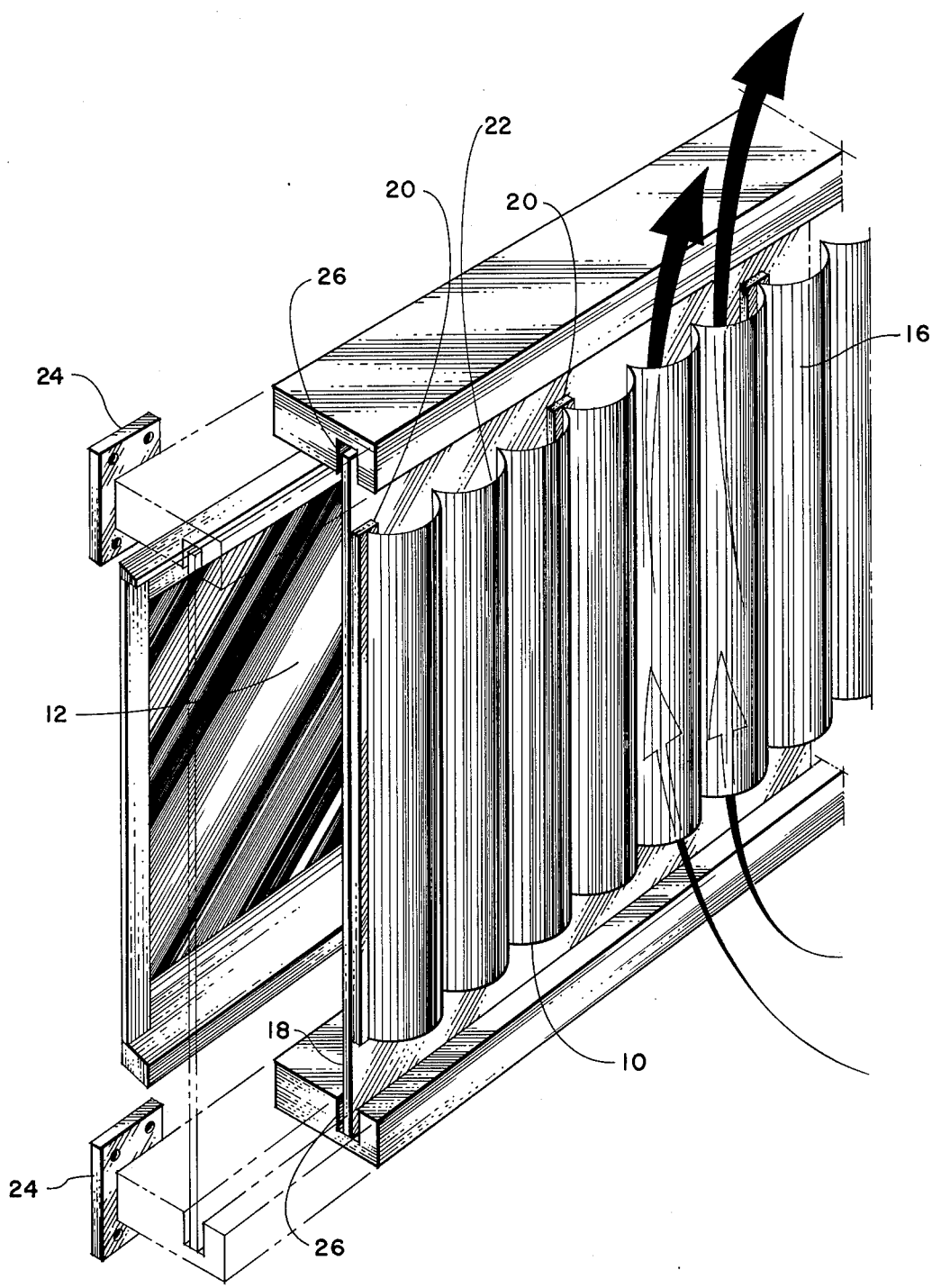
FIG. 1, is a perspective view of a window with an accompanying solar shield as viewed from the exterior and shows generally the details of the shield's construction and its relationship to the window.

Referring now to the drawings in more detail, it can be seen that there is illustrated in FIG. 1 a solar shield 10 partially positioned in front of a window 12 mounted in an exterior wall 14. The solar shield comprises a reflective surface piece 16 having a sun reflective exterior surface such as white paint and said shield further comprising a backing piece 18 located behind the surface piece 16. The surface piece 16 and backing piece 18 are separated by one or more spacers 20 which are from one half to four inches wide and which define a corresponding one half to four inch warm air channel 22 between the surface piece 16 and the backing piece 18. Warm air generated by the sun's impact on the surface piece 16, rises through the warm air channel 22, due to the natural tendency of warm air to rise, and passes into the exterior atmosphere. Both the reflective surface piece 16 and the backing piece 18 can be made of any suitable material such as wood, metal, or plastic. The reflective surface piece 16 can have a flat or, more preferably, a corrugated surface so that maximum reflective surface area is presented to the sun.

Figure 2:
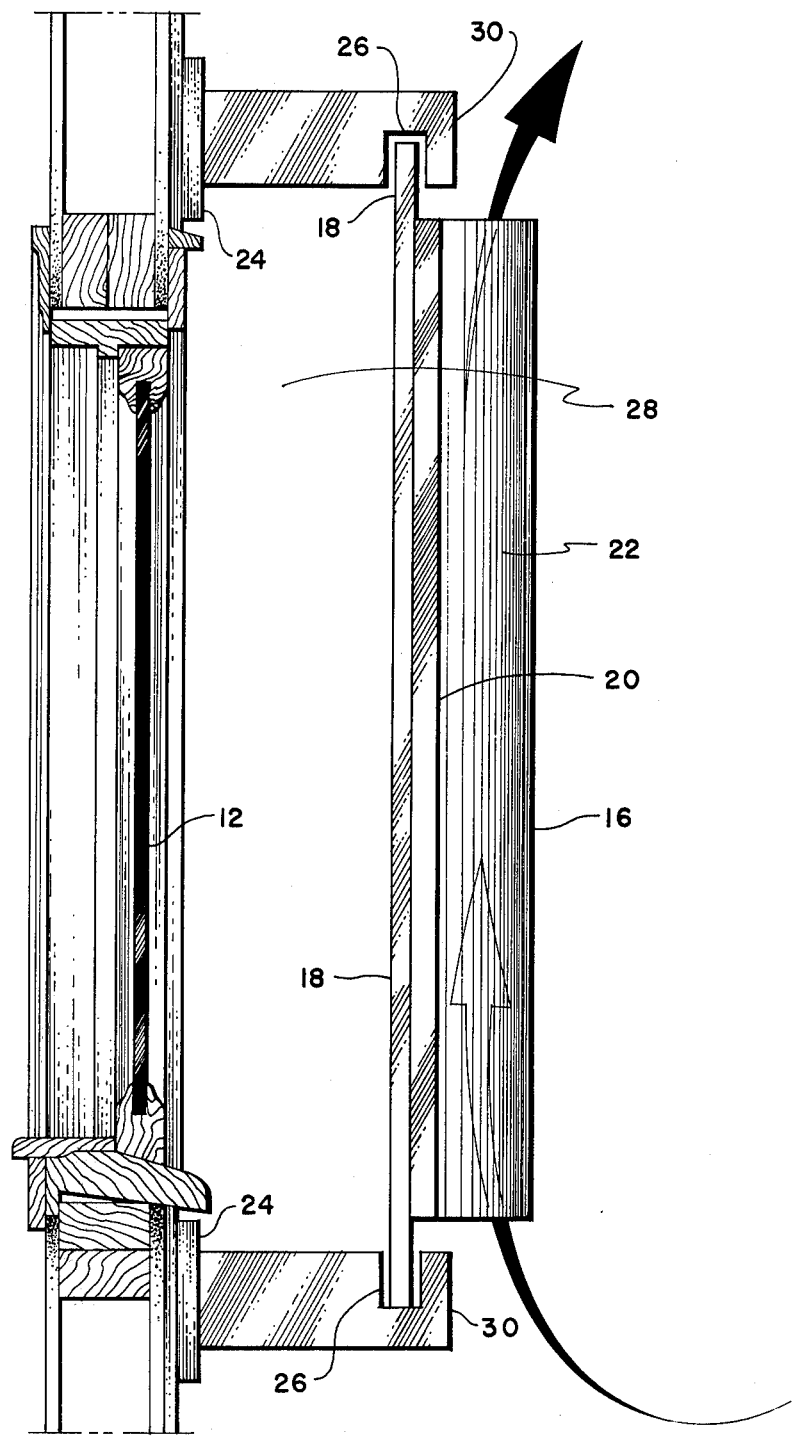
FIG. 2, is an end view which shows the details of one of many possible lateral slide means, namely an upper and lower bracket having a channel for receiving respectively the upper and lower edges of the backing piece so that the backing piece can be slid laterally in the channels.

The solar shield 10 can be positioned, either manually or automatically, in front of the window 12 by any suitable mounting means for positioning the shield in front of a window as for example rollers and hinges as well as the upper and lower mounting brackets 24 having slide channels 26 shown in FIGS. 1 and 2 adapted for receiving respectively, the upper and lower edges of the backing piece 18. As is best illustrated in FIG. 2, the backing piece 18 slides in the slide channels 26 of the mounting brackets 24 so that the solar shield can be laterally slid to a position substantially in front of the window 12 during that part of the day when the sun's energy is most intense and then slid away from the window later in the day when the sun's intensity has diminished.

Preferably, the spacers 20 should be wide enough that they position the reflective surface piece 16 away from the front verticle edges 30 of the slide channels 26 so that the upward flow of the rising warm air is not obstructed by the front verticle edge 30 of the channels.

An edge light space 28 is provided between the window 12 and the rear side of the backing piece 18 so that some sunlight comes into this space to partially light the room. It is contemplated that the people occupied room will be illuminated by artificial lighting means and/or the sunlight which is admitted through those room windows which do not face the sun and hence which are not covered with solar shields. The width of the edge light space 28 can be from one fourth inch to 6 inches.

The foregoing is considered as illustrative only of the principles of this invention. Furthermore, since numerous modifications and changes will readily occur to those skilled in the art, it is not desired to limit this invention to the exact construction and operation shown and described, and accordingly, all suitable modifications and equivalents may be resorted to, falling within the scope of this invention as claimed.

What is claimed is:

1. A solar shield for reflecting and dissipating solar energy before said solar energy enters a room's airspace, comprising:
   (a) reflective surface piece having a reflective surface facing the sun,
   (b) one or more spacers affixed between the reflective surface piece and a backing piece so that the spacer width creates and defines the width of a warm air channel between the reflective surface piece and a backing piece,
   (c) a backing piece which is slidably attached to a mounting means and which is affixed to the spacer(s) on the side of the backing piece which faces the sun, and wherein said backing piece defines the exterior surface of an edge light space located between said backing piece and a window being shielded,
   (d) mounting means for receiving the backing piece and for defining an edge light space between the rear side of the backing piece and the window being shielded.

2. A solar shield according to claim 1 wherein the reflective surface piece is corrugated metal.

3. A solar shield according to claim 2 wherein the width of the spacer(s), and hence the width of the air channel, is from one half to four inches and the width of the edge light space is from one fourth to six inches.

* * * * *